(12) United States Patent
Francis et al.

(10) Patent No.: US 8,140,502 B2
(45) Date of Patent: Mar. 20, 2012

(54) PRESERVING INDIVIDUAL INFORMATION PRIVACY BY PROVIDING ANONYMIZED CUSTOMER DATA

(75) Inventors: Jonathan Francis, Seattle, WA (US); Michael Stokes, Eagle, ID (US)

(73) Assignee: Microsoft Corporation, Redmond, WA (US)

( * ) Notice: Subject to any disclaimer, the term of this patent is extended or adjusted under 35 U.S.C. 154(b) by 668 days.

(21) Appl. No.: 12/163,135

(22) Filed: Jun. 27, 2008

(65) Prior Publication Data

US 2009/0327296 A1  Dec. 31, 2009

(51) Int. Cl.
*G06F 7/00* (2006.01)
*G06F 17/30* (2006.01)

(52) U.S. Cl. ......... 707/705; 707/706; 707/722; 707/735

(58) Field of Classification Search .................. 707/705, 707/711, 736, 757, 769, 781, 783, 706, 722, 707/735
See application file for complete search history.

(56) References Cited

U.S. PATENT DOCUMENTS

| | | | |
|---|---|---|---|
| 5,913,030 A | 6/1999 | Lotspiech et al. | |
| 6,694,303 B1 | 2/2004 | Agrawal et al. | |
| 6,931,403 B1 | 8/2005 | Agrawal et al. | |
| 7,302,420 B2 | 11/2007 | Aggarwal et al. | |
| 2002/0010679 A1* | 1/2002 | Felsher | 705/3 |
| 2003/0217106 A1 | 11/2003 | Adar et al. | |
| 2005/0125279 A1 | 6/2005 | Wu | |
| 2005/0223414 A1* | 10/2005 | Kenrich et al. | 726/27 |
| 2007/0140479 A1 | 6/2007 | Wang et al. | |
| 2007/0233711 A1 | 10/2007 | Aggarwal et al. | |
| 2007/0239982 A1 | 10/2007 | Aggarwal et al. | |
| 2007/0282796 A1* | 12/2007 | Evenhaim | 707/3 |
| 2009/0254971 A1* | 10/2009 | Herz et al. | 726/1 |

OTHER PUBLICATIONS

Boyens, et al., "Privacy-Preserving Data Releases for Health Report Generation", MEDINFO 2004, IMIA, pp. 1268-1272.
"Privacy Preserving Data Mining", retrieved at <<http://www.umbc.edu/ddm/wiki/Privacy_Preserving_Data_Mining>>, pp. 11.
Lindell, et al., "Privacy Preserving Data Mining", vol. 15, No. 3, Mar. 2008, pp. 26.
Aggarwal, et al., "An Introduction to Privacy-Preserving Data Mining", Kluwer Academic Publishers, pp. 76.

* cited by examiner

*Primary Examiner* — Vincent Boccio
(74) *Attorney, Agent, or Firm* — Alleman Hall McCoy Russell & Tuttle LLP

(57) ABSTRACT

A method of preserving individual information privacy for each of a plurality of customers while providing aggregated information about the plurality of customers includes storing static customer data and dynamic customer data of the plurality of customers in a protected database. The method includes restricting shared access to the static customer data and the dynamic customer data to a set of approved privacy-preserving queries. The privacy preserving queries include a privacy-preserving aggregation query that uses one or more parameters to indicate a characteristic of interest for which aggregation of the static customer data and the dynamic customer data is requested. The privacy-preserving aggregation query may be configured to retrieve aggregated customer data related to the characteristic of interest. The aggregated customer data may be returned in response to the privacy-preserving aggregation query not including any personally identifiable information of any particular one of the plurality of customers.

20 Claims, 4 Drawing Sheets

PRESERVING INDIVIDUAL INFORMATION PRIVACY BY PROVIDING ANONYMIZED CUSTOMER DATA

BACKGROUND

In order to be more relevant and effective, products should provide value to customers while at the same time protecting and preserving customer privacy. To provide value, products are designed to meet the needs of customers. This can be done by marketing the product to a group of customers whose needs are met by the product or changing the product to meet the needs of an anonymous representative group of customers. In a computing environment, websites may analyze data from customer actions in an attempt to know the needs of the customers. At the same time, the practice of personalizing the actions of individual customers may make customers feel uncomfortable, thus resulting in customers ceasing to use such websites. As such, customer privacy should be protected and preserved.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of preserving individual information privacy for each of a plurality of customers while providing aggregated information about the plurality of customers is disclosed. The method includes storing static customer data and dynamic customer data of the plurality of customers in a protected database. The method further includes restricting shared access to the static customer data and the dynamic customer data to a set of approved privacy-preserving queries. The privacy preserving queries may include a privacy-preserving aggregation query that uses one or more parameters to indicate a characteristic of interest for which aggregation of the static customer data and the dynamic customer data is requested. The privacy-preserving aggregation query may be configured to retrieve aggregated customer data related to the characteristic of interest. The aggregated customer data returned in response to the privacy-preserving aggregation query does not include any personally identifiable information of any particular one of the plurality of customers.

According to other aspects of the disclosure, an anonymous customer persona can be generated to include a primary characteristic of interest and one or more statistically significant secondary characteristics. This can be achieved by injecting noise into customer data returned responsive to a query and performing statistical regressions to find the statistically significant secondary characteristics.

DETAILED DESCRIPTION

Figure 1:
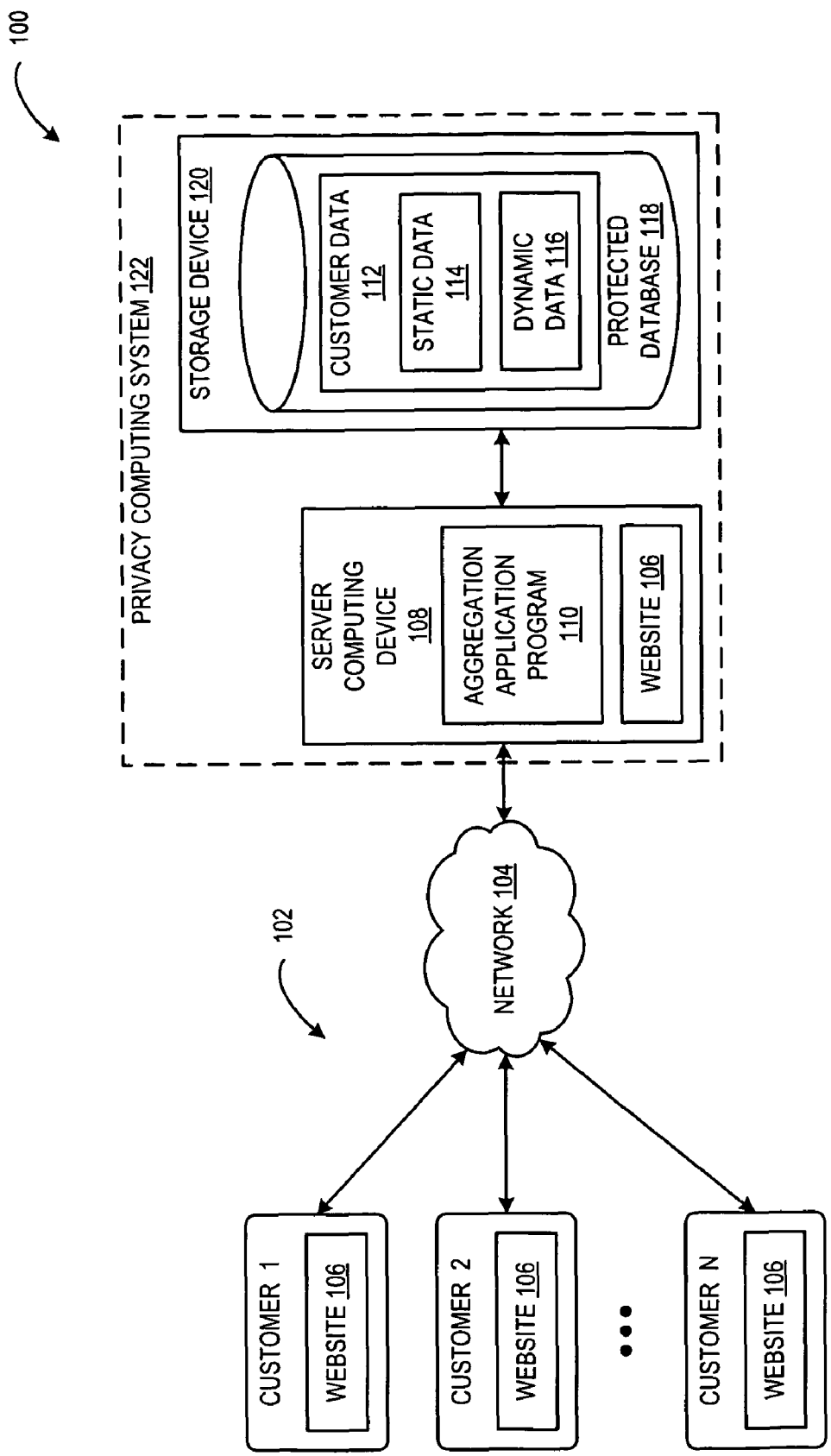
FIG. 1 is a schematic view of an embodiment of a networked-computing system in which customer data may be generated and collected.

FIG. 1 schematically illustrates an embodiment of a networked-computing system 100 in which customer data may be generated and collected through network interaction. Typically, in networked-computing system 100, customers (i.e., CUSTOMER 1, CUSTOMER 2, CUSTOMER N) may navigate to, and interact with, various different websites for different purposes, such as to view information, buy products, and/or use services. Networked-computing system 100 may include a plurality of customer computing devices 102 that are operatively coupled to network 104. Each customer may utilize one of the plurality of customer computing devices 102 to navigate to a website 106 via network 104. Website 106 may be hosted by a server computing device 108 configured to serve web pages, web applications, and/or other suitable content of website 106 to each of the plurality of customer computing devices 102 based on navigation operations (e.g., clicks) performed by each of the customers, respectively.

By interacting with website 106, customers may generate customer data 112. In order to make the content of website 106 more relevant and effective so that the website may be of more value to the customers, customer data 112 may be collected for analysis. In one example, analytics are performed on the customer data to produce aggregated data that identifies traits and behaviors of the customers, and such aggregated data may be used to recognize needs of the customers so that content, products, and/or services of the website may be improved to meet those needs. In the illustrated embodiment, an anonymizer program 110, executable by server computing device 108, may be configured to collect and store customer data 112 in storage device 120 accessible by server computing device 108. Customer data 112 collected by anonymizer program 110 may be organized into static data 114 and dynamic data 116 in a protected database 118.

Static data 114 may include personal information of each one of the customers. Some customer information may be customer-identifying attributes which alone or in combination may differentiate one customer from another. Static data 114 may be voluntarily provided by a customer or a customer computing device and/or may be requested by website 106. Non-limiting examples of static data may include demographic information (e.g., age: 65), physical information (e.g., height: 5'8"), health information (e.g., blood type: O-negative), socioeconomic information (e.g., income: $32,000), client computer information (e.g., internet protocol address), etc. It will be appreciated that static data typically may be provided by a customer to enhance interaction with a website. For example, a customer may provide personal medical records to a medical website in order to receive medical information that is relevant to the customer based on the customer's medical history. In some embodiments, static data 114 may be imported or otherwise obtained via a channel other than website 106.

Dynamic data 116 may include information generated by a customer during navigation of website 106. For example, dynamic data 116 may include navigational operations, such as clicks. Anonymizer program 110 may be configured to track the occurrence of each navigational operation as well as characteristics of each navigational operation (e.g., where on the website the click occurred) performed by a customer. Dynamic data 116 for each customer may be organized into a navigational log of customer network activity. In some cases, each entry of the navigational log of customer network activity may be time stamped or tagged so that a customer's navigational behavior may be more easily identified during data aggregation and when performing analytics.

By collecting both static data 114 and dynamic data 116, each type of data may be leveraged against the other type of data when performing analytics to produce aggregated data that characterizes customer traits and behaviors and/or when generating anonymous personas that can be used to determine how a primary characteristic of interest relates to one or more statistically significant secondary characteristics. The aggregated data and/or anonymous personas may be used to improve the website and/or products/services related to the website by addressing the specific needs of customers based on their traits and behaviors as identified by analytics.

In some cases, individual customers may have concerns about providing personally identifiable information to a website or may be uncomfortable with the idea that a website may be personalizing information about an individual customer. Based on such concerns, customers may choose to reduce interaction with the website in order to limit the amount of personally identifiable information that may be provided to the website. Moreover, in some cases, customers may attempt to mislead the website by providing false information. Such actions may result in the website becoming less effective and less valuable to the customers.

To help alleviate the privacy concerns of customers, customer data 112 generated from interaction with website 106 may be stored in a privacy computing system 122. Privacy computing system 122 may be configured to provide aggregated information about a plurality of customers interacting with website 106 while preserving individual information privacy of each of the customers interacting with website 106. Privacy computing system 122 may additionally or alternatively generate one or more anonymous personas that can be used to determine how a primary characteristic of interest relates to one or more statistically significant secondary characteristics.

Figure 2:
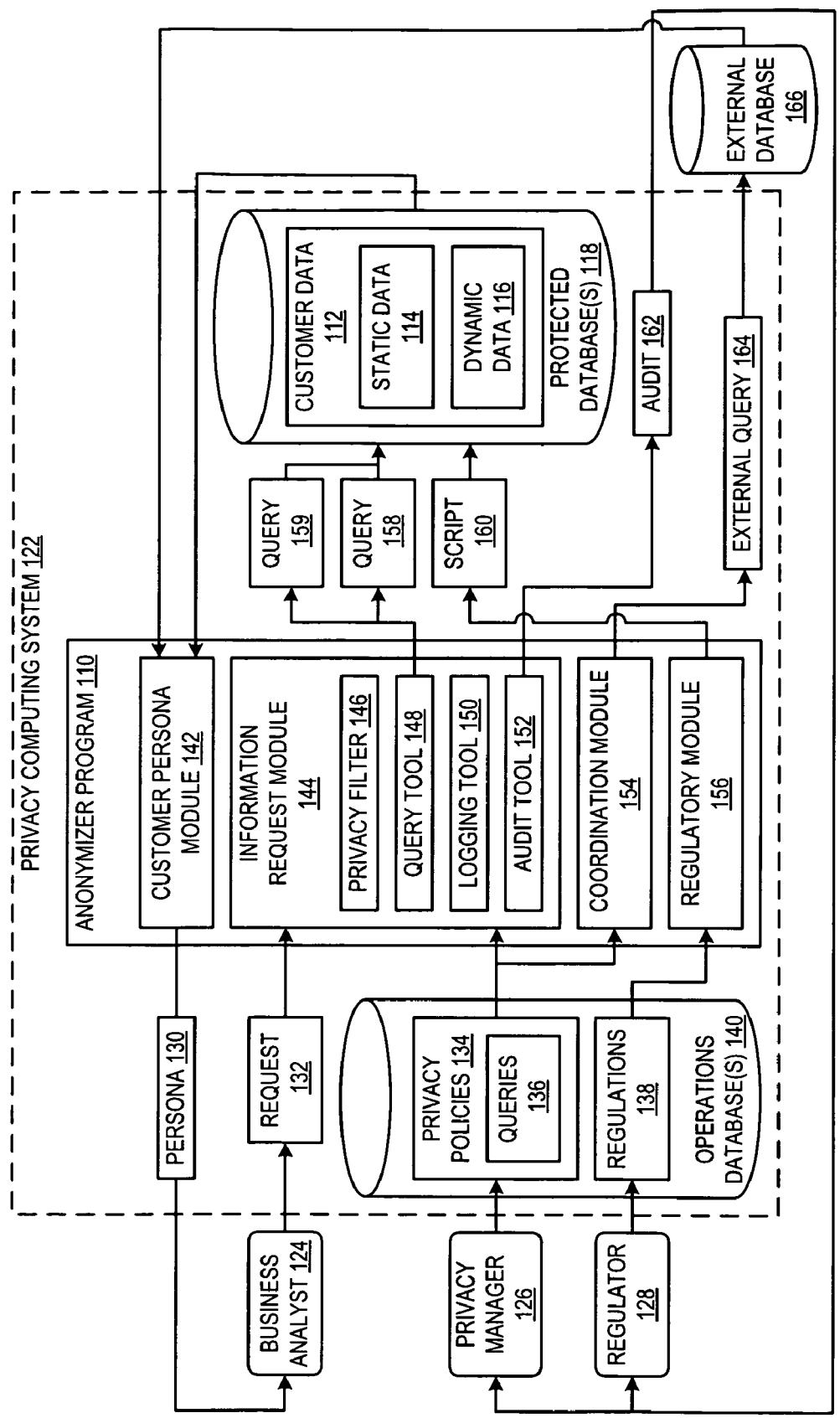
FIG. 2 is a schematic view of an embodiment of a privacy computing system that protects personally identifiable information of customers from being revealed when analytics are performed on the customer data.

FIG. 2 schematically shows an embodiment of privacy computing system 122. Privacy computing system 122 may include protected database 118 in which customer data 112 generated via customer interaction with website 106 of FIG. 1 may be stored. Protected database 118 may be dynamically encrypted such that access by personnel (e.g., business analyst 124, privacy manager 126, regulator 128, and other entities, such as corporate employees) may be restricted so that no individual has permission to go directly upstream to retrieve customer data in an unprotected manner. In particular, access to protected database 118 may be limited to automatic scripts with strict source code and execution control that may be setup and dynamically managed by a privacy manager 126. Although protected database 118 is illustrated as a single database, it will be appreciated that static data 114 may be stored in one or more protected databases and dynamic data 116 may be stored in one or more common and/or different protected databases.

Privacy manager 126 may create privacy policies 134, stored in operations database 140, that dictate whom may access the protected database, what customer data may be retrieved, and what the retrieved customer data may be used for, among other actions. Privacy policies 134 may include a set of approved privacy-preserving queries 136 that may be used by anonymizer program 110 to retrieve customer data from protected database 118. The set of approved privacy-preserving queries 136 may include a privacy-preserving aggregation query 158 that uses one or more parameters to indicate a characteristic of interest for which aggregation of static data 114 and dynamic data 116 is requested. Privacy-preserving aggregation query 158 may be configured to retrieve aggregated customer data related to the characteristic of interest. The aggregated customer data returned in response to privacy-preserving aggregation query 158 shall not include any personally identifiable information of any particular customer.

The set of approved privacy-preserving queries 136 may additionally or alternatively include a privacy-preserving, anonymous-persona query 159. In some embodiments, the privacy-preserving, anonymous-persona query may use a parameter to indicate a primary characteristic of interest. Privacy-preserving, anonymous-persona query 159 can be configured to inject noise into returned customer data. It will be appreciated that noise may be injected by a privacy filter of an anonymizer program of the privacy computing system. Since the queries can be noise injected, the individual privacy of any particular customer can be protected because subsequent steps operate on effectively anonymous data. As such, subsequent steps can be used to generate an anonymous persona without compromising the individual privacy of any particular customer.

One or more statistical analysis can be performed on results returned from the privacy-preserving, anonymous-persona query to determine statistically significant correlations between the primary characteristic of interest and one or more secondary characteristics. As such, an anonymous customer persona including the primary characteristic of interest and one or more statistically significant secondary characteristics can be generated. Various statistical analysis can be used to find statistically significant secondary characteristics. Cluster analysis, regression analysis, decision tree analysis, survival analysis, and profitability modeling are nonlimiting examples of statistical analysis that may be used to find statistically significant secondary characteristics.

The noise injected data can additionally or alternatively be analyzed (statistically or otherwise) in a privacy-preserving manner in order to determine customers who may benefit from a particular application or service. Such analysis may include finding correlations between two or more different customer characteristics, or otherwise identifying an aspect of an anonymous customer persona that may benefit from a particular application or service.

Nonlimiting example types of analysis include, but are not limited to, the following:
  Customer segmentation (e.g., use cluster analysis to identify different sub-groups of customers using a particular application or service);
  Propensity to create account (e.g., use regression analysis or decision trees to determine characteristics of users likely to create an account based on their customer profile);
  Customer lifetime value (e.g., use survival analysis and profitability modeling to estimate a customer's profitability based on customer profile and retention profile);
  Cross/up sell (e.g., use regression analysis to identify characteristics of a particular user likely to authorize additional applications to their account);
  Churn analysis (e.g., use regression analysis or survival analysis to identify consumers likely to cancel account or stop using application or service).

Anonymizer program 110 may be configured to control access to protected database 118 based on privacy policies 134. Anonymizer program 110 may include an information request module 144 configured to receive a request 132 for customer information from a business analyst 124. Business analyst 124 may utilize the customer information for analytics purposes to provide directed website and/or product improvement that meets the needs of customers. Request 132 may include one or more parameters indicating a characteristic of interest about a subset of customers for which aggregated data is requested or for which an anonymous persona is to be generated. In order to ensure that business analyst 124 is free from taint of personally identifiable information of a particular customer as well as to preserve the individual information privacy of each respective customer, anonymizer program 110 may include a query tool 148 configured to generate a privacy-preserving aggregation query 158 that includes one or more parameters from request 132 that indicate a specified characteristic of interest and/or to generate a privacy-preserving, anonymous-persona query 159 that includes parameter(s) from the request.

Information request module 144 may include a statistical filter 146 configured to inject noise into a privacy-preserving query. In some embodiments, noise injected into a privacy-preserving query may cause raw customer data from protected database 118 to be injected with noise so that the customer-identifying attributes of each customer are kept private.

Anonymizer program 110 may use privacy-preserving aggregation query 158 to retrieve aggregated customer data for a plurality of customers having a characteristic of interest specified in request 132. In some embodiments, the aggregated customer data is retrieved via one-way hashing of the protected database. One-way hashing may cause personally identifiable information of an individual customer to become relevant information that does not identify that customer. Protected database 118 may be configured to accept one-way hashes in order to provide another level of protection to preserve the privacy of personally identifiable information of each customer. It will be appreciated that other privacy-preserving techniques may be implemented to further protect the identity of each customer while providing aggregated customer data for a plurality of customers for analytics.

Information request module 144 may include a logging tool 150 configured to automatically log all access to the protected database. Such logging may identify, for each instance of access to the protected database, at least an indication of content retrieved from the protected database and a recipient of content retrieved from the protected database. A non-limiting example of logged access to the protected database may include an instance of a privacy-preserving query having one or more parameters indicating a characteristic of interest submitted by a business analyst. In this example, the log entry may include the aggregated customer data retrieved from the protected database, the anonymous persona information retrieved from the protected database, the identity of the business analyst, and/or other relevant information.

Information request module 144 may include an auditing tool 152 configured to audit logged access of the protected database to ensure an unapproved party has not retrieved personally identifiable information for any particular customer. Auditing tool 152 may be configured to generate an audit 162 that is sent to privacy manager 126 to show compliance with privacy policies 134. In the event that an audit shows non-compliance, privacy manager 126 may dynamically modify privacy policies 134 to ensure that future access to protected database 118 preserves the individual information privacy of each of the customers. Further, audit 162 may be sent to regulator 128 to show compliance with privacy policies 134. By sending audit 162 to regulator 128, privacy-preserving practices may be made transparent so that it may be made clear that analytics are being performed with good intentions and continued oversight to ensure that individual information privacy is preserved for each customer.

Anonymizer program 110 may include a regulatory module 156 configured to receive privacy regulations 138 from operations database 140. Regulator 128 may provide new privacy regulations or may update existing privacy regulations of operations database 140 based on changes to privacy laws, statues, rules etc. Regulatory module 156 may be configured to modify access to protected database 118 in response to receiving a privacy regulation. In particular, regulatory module 156 may generate a script 160 that enforces the privacy regulations and anonymizer program 110 may run script 160 on protected database 118 to modify access to customer data 112 to comply with privacy regulations 138. For example, the customer data may include an internet protocol (IP) address for each of the plurality of customers realized dynamically upon each customer visiting website 106 of FIG. 1. The IP address may be stored as dynamic data 116. Further, customer data 112 may include a persistent, privacy-preserving pseudo-random identification generated to correspond to that internet protocol address. The persistent, privacy-preserving pseudo-random identification may be stored as both static data 114 and dynamic data 116 and may act as a primary join key. A privacy regulation may declare that the (IP) address for each customer may be stored for a limited duration. Accordingly, the regulatory module may be configured to replace the IP address with the privacy-preserving pseudo-random identification for each customer in response to exceeding the duration and may remove the IP address of each of the customers from the projected database(s).

Although operations database 140 is illustrated as a single database, it will be appreciated that privacy policies 134 may be stored in one more different databases and regulations 138 may be stored in one or more different databases.

Anonymizer program 110 may include an anonymous customer persona module 142 configured to generate an anonymous customer persona 130 from customer data retrieved from protected database 118. Anonymous customer persona 130 may be a customer persona of a subset of the plurality of customers that are related through the characteristic of interest. Anonymous customer persona 130 may include noise injected customer data that is representative of the subset of customers. In particular, anonymous customer persona 130 may include dynamic data such as network activity information for the subset without supplying customer-identifying attributes for any particular one customer of the subset. Further, anonymous customer persona 130 may include static data representative of the subset. In some cases, the aggregated static or dynamic customer data may be modified (e.g., averaged) to be representative of the subset of customers. A non-limiting example of an anonymous customer persona for a characteristic of interest, such as a single mother, may include a Jane Doe having the average age of the subset, the average number of children of the subset, the average income of the subset, the average number of advertisements on the website that were clicked, the most frequently clicked advertisement, the most frequently purchased product, etc.

Furthermore, anonymous customer persona creation module 142 may be configured to only generate an anonymous persona if a subset of customers is large enough to preserve the individual information privacy of each customer of the plurality of customers. Thus, if a particular characteristic of interest causes customer data to be retrieved for only one or another number below a threshold, anonymous persona creation module 142 may generate an indication that not enough customers have customer data that relates to the specified characteristic of interest. In such a case, business analyst 124 may adjust one or more parameters to identify a characteristic of interest for a larger customer subset.

Anonymizer program 110 may include an external database coordination module 154 configured to generate an external query 164 to retrieve external data from an external database 166 that exists outside of privacy computing system 122. In particular, external query 164 may include a specified characteristic of interest, an anonymous persona, and/or aggregated customer data as parameters to retrieve external data that is relevant to a subset of customers for which an anonymous customer persona is created. Non-limiting examples of external data that may be relevant to an anonymous customer persona for a subset of customers may include geographical data, customer purchase data at an external partner, and navigational activity data at an external partner, etc. Anonymous customer persona module 142 may be configured to merge external data retrieved from external database 166 with customer data retrieved from protected database 118 to expand anonymous customer persona 130 so that the anonymous customer persona may be made more relevant and informative.

In some embodiments, anonymizer program 110 may be configured to request each customer interacting with website 106 of FIG. 1 to agree to contribute to anonymous data aggregation and/or persona generation or agree to cooperate with external partners to perform anonymous data aggregation and/or persona generation using external data. Indication of such an agreement may be incorporated into privacy policies 134. Thus, external database coordination module 154 may only send external query 164 to external database 166 for a particular customer if that customer has agreed to cooperation with external partners. Further, anonymous customer persona module 142 may be configured to generate an anonymous customer persona only from customer data from those customers that agree to contribute to anonymous persona generation or may generate an anonymous customer persona that includes external data only from those customers that agree to cooperation with external partners. In this way, privacy-preserving analytic practices may be shown to be made with good intentions and transparency to the customer.

In some embodiments, logging tool 150 may be configured to log each instance of use of an external query of an external database. Such logs may identify the parameters of the external query and a recipient of the anonymous customer persona in which the retrieved external data was used. Further, audit tool 152 may be configured to audit the logged use of an external query to ensure that individual information privacy is preserved for each customer.

Figure 3:
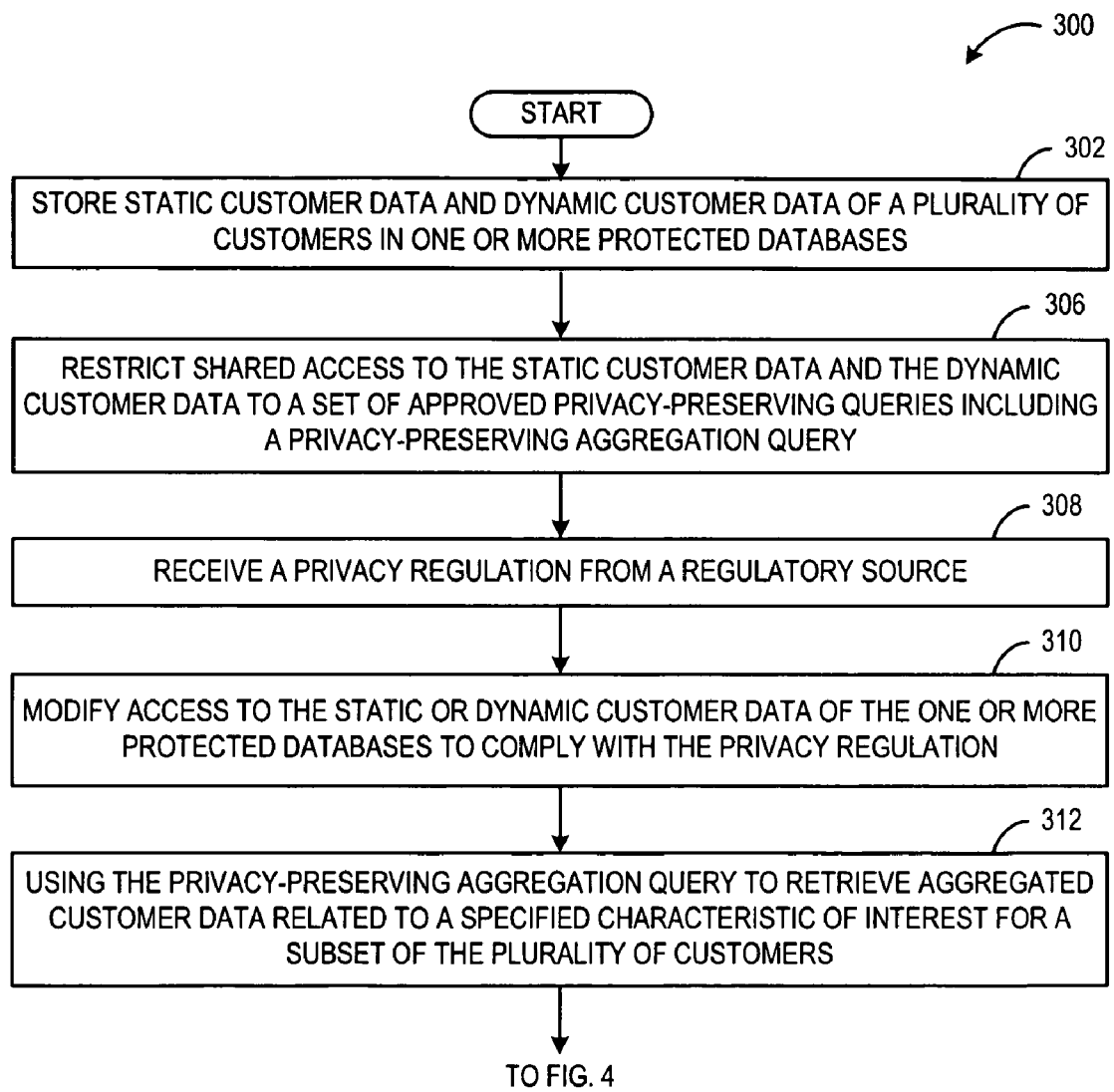
FIGS. 3-4 show a process flow of an example method of providing aggregated information about a plurality of different customers while preserving individual information privacy for each of the plurality of different customers.
Figure 4:
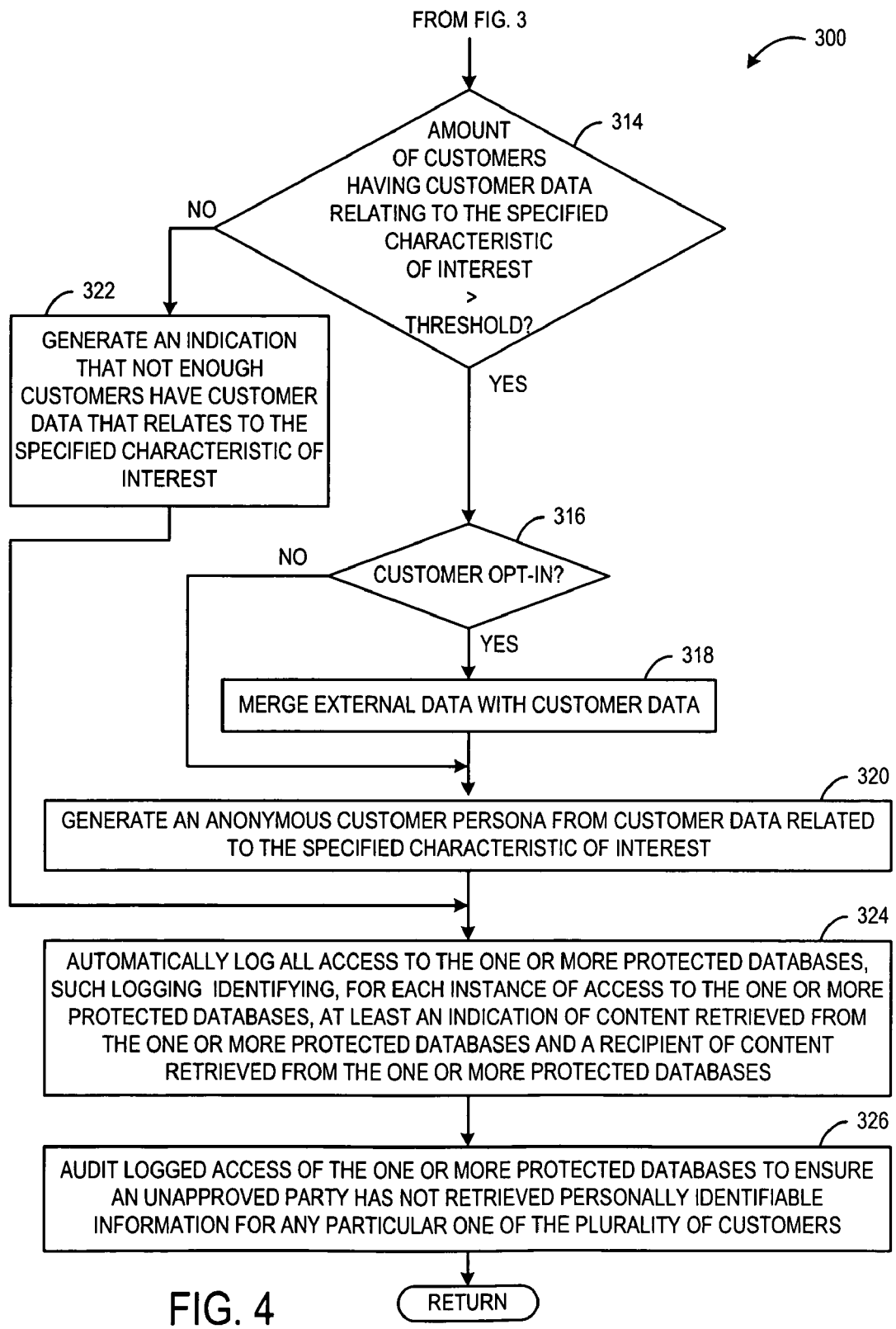

FIGS. 3-4 show a process flow of an example method 300 for providing aggregated customer data while preserving the individual information privacy of a plurality of customers. In FIG. 3, method 300 may include, at 302, storing static customer data and dynamic customer data of a plurality of customers in one or more protected databases. Static and dynamic customer may be generated, in one example, via customer interaction with a website. The one or more protected databases may be included in a privacy computing system, as described above.

At 306, the method may include restricting shared access to the static customer data and the dynamic customer data to a set of approved privacy-preserving queries including a privacy-preserving aggregation query. The privacy-preserving aggregation query can use one or more parameters to indicate a characteristic of interest for which aggregation of the static customer data and the dynamic customer data is requested. The privacy-preserving aggregation query may be configured to retrieve aggregated customer data related to the characteristic of interest. Further, the aggregated customer data returned in response to the privacy-preserving aggregation query shall not include any personally identifiable information of any particular one of the plurality of customers. The set of approved privacy-preserving queries may be included in privacy policies set by a privacy manager. It will be appreciated that restricting access to the customer data may be accomplished by operations of an anonymizer program.

At 308, the method may include receiving a privacy regulation from a regulatory source. This privacy regulation may be received from a regulator and stored in an operations database of the privacy computing system that is accessible by the anonymizer program, as described above.

At 310, the method may include modifying access to the static or dynamic customer data of the one or more protected databases to comply with the privacy regulation. It will be appreciated that a regulatory module of the anonymizer program may generate a script that enforces the privacy regulation and the regulatory module may be configured to run the script on the one or more protected databases to modify access to the customer data to comply with the privacy regulation.

At 312, the method may include using the privacy-preserving aggregation query to retrieve aggregated customer data related to a specified characteristic of interest for a subset of the plurality of customers. It will be appreciated that a query tool of the anonymizer program may generate the privacy-preserving aggregation query using parameters submitted by a business analyst and the privacy-preserving aggregation query may retrieve aggregated customer data that does not include any personally identifiable information of any particular one of the plurality of customers from the one or more protected databases.

Continuing to FIG. 4, at 314, the method may include determining if an amount of customers having customer data relating to the specified characteristic of interest exceeds a threshold. The threshold may be an amount of customers at which individual information privacy of each of the plurality of customers no longer may be preserved. If it is determined that the amount of customers having customer data relating to the specified characteristic of interest exceeds the threshold, the method moves to 316. Otherwise, the amount of customers having customer data relating to the specified characteristic of interest does not exceed the threshold and the method moves to 322.

At 316, the method may include requesting that a customer opt-in to an agreement to contribute to anonymous data aggregation or an agreement to cooperate with external partners to perform anonymous data aggregation using external data. The anonymizer program may prompt a customer with the opt-in agreement during website interaction. By opting-in to the agreement, a customer may permit external data related to customer data of the customer to be retrieved and merged with aggregated customer data retrieved from the one or more protected databases in order to expand an anonymous customer persona of the subset of the plurality of customers. If the customer opts-in to the agreement, the method moves to 318. Otherwise, the customer does not opt-in to the agreement, and the method moves to 320 (or returns if the customer does not agree to any aggregation).

At 318, since the customer has agreed to opt-in to the agreement, an external database coordination module of the anonymizer program may generate a query having parameters that include the characteristic of interest and/or the aggregated customer data to retrieve related external data from an external database. Thus, at 318, the method may include merging external data with customer data. The external data may be retrieved from an external database and the customer data may be retrieved from the one or more protected databases. It will be appreciated that the external data may be merged with the customer data by an anonymous customer persona module of the anonymizer program.

At 320, the method may include generating an anonymous customer persona from customer data related to the specified characteristic of interest of the subset of the plurality of customers (or the subset of the plurality of customers opting-in to a particular type of aggregation). The customer data may include aggregated customer data retrieved from the one or more protected databases as well as external data corresponding to customers that agreed to opt-in to the agreement to coordinate data aggregation with external databases. It will be appreciated that the anonymous customer persona may be generated by the anonymous customer persona module of the anonymizer program.

Returning to 322, the method may include generating an indication that not enough customers have customer data that relates to the specified characteristic of interest. It will be appreciated that the indication may be generated by the anonymous customer persona module of the anonymizer program.

At 324, the method may include automatically logging all access to the one or more protected databases, such logging identifying, for each instance of access to the one or more protected databases, at least an indication of content retrieved from the one or more protected databases and a recipient of content retrieved from the one or more protected databases. It will be appreciated that logging access to the one or more protected databases may be accomplished by a logging tool of the anonymizer program.

At 326, the method may include auditing logged access to the one or more protected databases to ensure an unapproved party has not retrieved personally identifiable information for any particular one of the plurality of customers. It will be appreciated that auditing logged access to the one or more protected databases may be accomplished by an auditing tool of the anonymizer program.

It will be appreciated that the computing devices described herein may include one or more of any suitable computing devices configured to execute the programs described herein. For example, the computing devices may include a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of preserving individual information privacy for each of a plurality of customers while providing aggregated information about the plurality of customers, the method comprising:
   storing static customer data and dynamic customer data of the plurality of customers in one or more dynamically encrypted databases that restrict access by any personnel to directly retrieve static customer data and dynamic customer data of one of the plurality of customers, the dynamic customer data including navigational operations and characteristics of the navigational operations performed by each of the plurality of customers via interaction with one or more websites where at least some static customer data is aggregated; and
   restricting shared access to the static customer data and the dynamic customer data to a set of approved privacy-preserving queries, including a privacy-preserving aggregation query that uses one or more parameters to indicate a characteristic of interest for which aggregation of the static customer data and the dynamic customer data is requested, the privacy-preserving aggregation query configured to retrieve aggregated customer data related to the characteristic of interest, the aggregated customer data not including any personally identifiable information of any particular one of the plurality of customers.

2. The method of claim 1, further comprising:
   automatically logging all access to the one or more dynamically encrypted databases, such logging identifying, for each instance of access to the one or more dynamically encrypted databases, at least an indication of content retrieved from the one or more dynamically encrypted databases and a recipient of content retrieved from the one or more dynamically encrypted databases.

3. The method of claim 2, further comprising:
   auditing logged access of the one or more dynamically encrypted databases to ensure an unapproved party has not retrieved personally identifiable information for any particular one of the plurality of customers.

4. The method of claim 1, further comprising:
   receiving a privacy regulation from a regulatory source; and
   modifying access to the static or dynamic customer data of the one or more dynamically encrypted databases to comply with the privacy regulation.

5. The method of claim 4, where the privacy regulation includes a duration in which the static or dynamic customer data is accessible, and modifying access to the static or dynamic customer data includes restricting access to at least some of the static or dynamic customer data upon exceeding the duration.

6. The method of claim 4, further comprising:
   generating a script for enforcing the privacy regulation; and
   running the script on the one or more dynamically encrypted databases to modify access to the static or dynamic customer data to comply with the privacy regulation.

7. The method of claim 4, where the dynamic customer data includes an internet protocol address for each of the plurality of customers and both the static customer data and the dynamic customer data include a persistent, privacy-preserving pseudo-random identification corresponding to that internet protocol address.

8. The method of claim 7, where the privacy regulation includes a duration in which the internet protocol address of each of the plurality of customers is stored in the one or more dynamically encrypted databases, the method further comprising:

replacing the internet protocol address with the privacy-preserving pseudo-random identification for each of the plurality of customers in response to exceeding the duration.

9. The method of claim 1, where the dynamic customer data includes a navigational log of customer network activity.

10. The method of claim 1, where the aggregated customer data related to the specified characteristic of interest is retrieved via one-way hashing of the one or more dynamically encrypted databases.

11. A method of preserving individual information privacy for each of a plurality of customers while providing an anonymous customer persona corresponding to the plurality of customers, the method comprising:

storing static customer data and dynamic customer data of the plurality of customers in one or more dynamically encrypted databases that restrict access by any personnel to directly retrieve static customer data and dynamic customer data of one of the plurality of customers, the dynamic customer data including navigational operations and characteristics of the navigational operations performed by each of the plurality of customers via interaction with one or more websites where at least some static customer data is aggregated;

restricting shared access to the static customer data and the dynamic customer data to a set of approved privacy-preserving queries, including a privacy-preserving, anonymous-persona query that uses a parameter to indicate a primary characteristic of interest, the privacy-preserving, anonymous-persona query configured to inject noise into returned customer data;

performing statistical analysis on results returned from the privacy-preserving, anonymous-persona query to determine statistically significant correlations between the primary characteristic of interest and one or more secondary characteristics; and generating an anonymous customer persona including the primary characteristic of interest and the one or more statistically significant secondary characteristics.

12. The method of claim 11, where the anonymous customer persona is only generated if a number of customers used to generate the persona is large enough to preserve individual information privacy of each of the plurality of customers.

13. The method of claim 11, further comprising:
merging external data with the static or dynamic customer data to expand the anonymous customer persona.

14. The method of claim 13, where the external data includes one or more of geographical data, anonymous purchase data at an external partner, and navigational activity data at an external partner.

15. The method of claim 13, further comprising:
logging each instance of an external query of an external database for external data used to create the anonymous customer persona, each log entry including parameters of the external query and a recipient of the anonymous customer persona; and auditing logged instances of an external query to ensure an unapproved party has not retrieved personally identifiable information for any particular one of the plurality of customers.

16. The method of claim 11, further comprising:
automatically logging all access to the customer data, such logging identifying, for each instance of access, at least an indication of retrieved content and a recipient of retrieved content.

17. The method of claim 16, further comprising:
auditing logged access to the customer data to ensure an unapproved party has not retrieved personally identifiable information for any particular one of the plurality of customers.

18. The method of claim 11, where the static customer data includes one or more customer-identifying attributes for each of the plurality of customers.

19. The method of claim 11, where the dynamic customer data includes a navigational log of customer network activity for each of the plurality of customers.

20. A method of preserving individual information privacy for each of a plurality of customers while providing an anonymous customer persona corresponding to the plurality of customers, the method comprising:

storing static customer data and dynamic customer data of the plurality of customers in one or more dynamically encrypted databases that restrict access by any personnel to directly retrieve static customer data and dynamic customer data of one of the plurality of customers, the dynamic customer data including navigational operations and characteristics of the navigational operations performed by each of the plurality of customers via interaction with one or more websites where at least some static customer data is aggregated;

restricting shared access to the static customer data and the dynamic customer data to a set of approved privacy-preserving queries, including a privacy-preserving, anonymous-persona query configured to inject noise into returned customer data;

generating an anonymous customer persona having one or more characteristics of interest based on analyzed results returned from the privacy-preserving, anonymous-persona query, the anonymous customer persona not including any personally identifiable information of any particular one of the plurality of customers.

* * * * *